John F. Boynton  Steam Generator
3809
Reissued Jan 25 1870
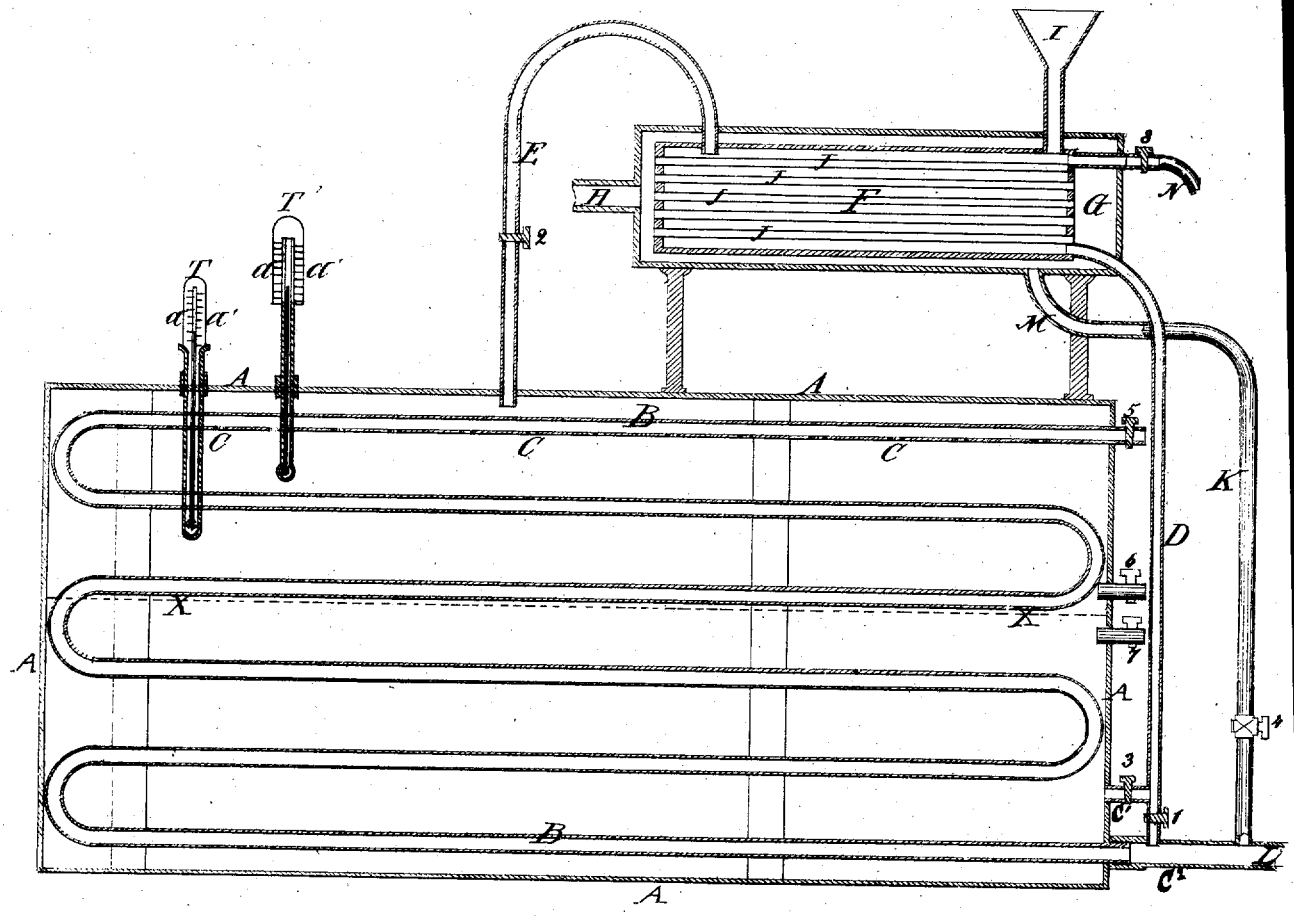
Witnesses
M. C. Stoddard
E. T. Stoddard
Signature
Henri A. Strant

UNITED STATES PATENT OFFICE.

HENRI L. STUART, OF NEW YORK, N. Y., ASSIGNEE OF JOHN F. BOYNTON.

IMPROVEMENT IN STEAM-GENERATORS.

Specification forming part of Letters Patent No. 68,598, dated September 10, 1867; antedated July 19, 1867; Reissue No. 3,102, dated August 25, 1868; Reissue No. 3,809, dated January 25, 1870.

DIVISION B.

*To all whom it may concern:*

Be it known that I, HENRI L. STUART, of the city, county, and State of New York, by virtue of an assignment from JOHN F. BOYNTON, of Syracuse, New York, bearing date the 6th day of October, 1866, am the sole owner of certain Letters Patent for Improvements in Steam-Generators, granted to the said JOHN F. BOYNTON on the 10th day of September, 1867, and reissued August 25, 1868, No. 3,102, Division B; that I deem said patent as reissued inoperative and invalid by reason of a defective specification; and I do declare that the following is a full, clear, and exact description of that part of said invention included in this division.

My invention, as set forth in this division, relates to a method of preventing steam-boilers from bursting; and it consists in a means for equalizing the temperature in all parts of the boiler.

It is a well-known fact that steam, like air or gases, is a poor conductor of heat, so that steam in the upper part of the boiler or steam-chamber may be heated much higher than the steam in a lower part, which lies in contact with the water. Again, it is known that steam and gas will not convey heat downward as readily as upward, as the heat conveyed downward is by radiation, while that conveyed upward is by translation of particles. As in the case of water, steam is a poor conductor of heat by radiation, but a rapid diffuser by translation of its atoms. It is believed that explosions of steam-boilers often occur from the steam in the upper portion of the steam-space becoming much hotter that in the lower portion, causing an unequal expansion of the different parts of the boiler, tending to produce strains, ruptures, and explosions. By the devices herein set forth I cause a shower of water to be regularly ejected into the steam-space of the boiler at intervals, transferring the heat from the steam to the water and producing an equilibrium of temperature.

The accompanying drawing represents a vertical section of a steam-boiler with internal pipes for this purpose, and of an automatic heater and feeder attached thereto.

A is the shell of the boiler; B B, water and steam pipes running through the boiler from bottom to top. C, openings or jets in the upper portion of the pipe, for the passage of steam or water. C′ is the induction-pipe for introducing feed-water into the boiler, and $C^2$ is the induction-pipe for introducing water into the tube B. Dotted line $x\ x$ shows the water-line of the boiler. The water being forced into the tube B through induction-pipe $C^2$, while passing through said tube B will be increasing in temperature until it passes the water-line, where it will begin to expand into steam, and will finally be discharged in steam and water commingled through the openings C in the upper stratum of steam in the boiler, thus securing an equilibrium of steam throughout the boiler; or the water may be heated in any other suitable or convenient manner and injected into the steam-space of the boiler. The water may also be taken from the lowest part of the boiler and thus injected, accomplishing the same result.

In connection with this improvement I prefer to use an automatic heater and feeder of the following construction: F is a reservoir, in which water is first heated by the exhaust-steam, and from which it is automatically fed to the boiler. E is a steam-pipe for equalizing the pressure in the boiler and the automatic reservoir F. H is the induction-pipe for the exhaust-steam; *g*, a chamber surrounding the automatic reservoir for heating the feed-water and condensing the escaped steam. I is the exit for the uncondensed exhaust-steam; J, flues for the passage of escaped steam; D, a pipe for the conveyance of water by its own gravity from the reservoir F to the boiler or the tube B; K, a pipe for the passage of the water of the condensed steam to the force-pump; L, point for attaching a force-pump; N, feed-pipe for supplying reservoir from a hydrant or cistern automatically by means of the vacuum formed by condensing steam when cocks 1, 2, and 3 are closed and No. 8 open; and M M are supports for the automatic feeder. When cock 2 is opened, the pressure of the steam in the boiler and in the automatic reservoir will cause the water to flow by its own gravity into the boiler through pipe D if cock 3 be opened, or into tube B if cock 1 be opened. When cock 4 in pipe K is open, the water of the condensed steam will flow down to the orce-pump. It will be observed that whenf cock No. 1 is closed and cocks Nos. 2 and 3 open the water from the reservoir will pass directly into the boiler without traversing the tube B. When cock 3 is closed and 1 and 2 open, the water will pass into tube B only; but when cocks 1 2 3 are all open the water will pass from the reservoir into the boiler directly and into the tube B at the same time. Before passing to the boiler or the tube B the water will be warmed by means of the exhaust-steam.

What I claim in this division as the invention of the said JOHN F. BOYNTON, and desire to secure by Letters Patent, is—

1. The equalization of the temperature of various parts of steam-boilers by injecting water into the steam-space of such boilers, substantially as set forth.

2. The apparatus herein shown and set forth, or its equivalent, when used for this purpose, the same operating in the manner set forth to equalize the temperature of steam-boilers, substantially as described.

H. L. STUART.

Witnesses:
J. A. BASSETT,
H. CARLOS.